(12) United States Patent
Brito da Silva Correia

(10) Patent No.: US 9,028,789 B2
(45) Date of Patent: May 12, 2015

(54) PROCESS TO PRODUCE LITHIUM CARBONATE DIRECTLY FROM THE ALUMINOSILICATE MINERAL

(76) Inventor: Pedro Manuel Brito da Silva Correia, Estoril (PT)

( * ) Notice: Subject to any disclaimer, the term of this patent is extended or adjusted under 35 U.S.C. 154(b) by 27 days.

(21) Appl. No.: 13/470,360

(22) Filed: May 14, 2012

(65) Prior Publication Data

US 2013/0302237 A1 Nov. 14, 2013

(51) Int. Cl.
*C01D 15/08* (2006.01)

(52) U.S. Cl.
CPC .......................................... *C01D 15/08* (2013.01)

(58) Field of Classification Search
CPC ....................................................... C01D 15/08
USPC ........................................ 423/419.1, 421, 429
See application file for complete search history.

(56) References Cited

U.S. PATENT DOCUMENTS

| 2,331,838 | A | 10/1943 | Lindblad et al. |
| 3,112,170 | A | 11/1963 | Archambault et al. |
| 4,124,684 | A | 11/1978 | Olivier et al. |
| 2004/0213705 | A1* | 10/2004 | Blencoe et al. ............... 422/129 |
| 2006/0171869 | A1* | 8/2006 | Anovitz et al. ............ 423/179.5 |

* cited by examiner

*Primary Examiner* — Richard M Rump

(57) ABSTRACT

Process for obtaining lithium carbonate directly from the mineral containing silicium, aluminum, lithium and other metal oxides without the need to dissolve previously all oxides in sulphuric acid or alkaline hydroxides at high temperatures and pressures, by using carbon dioxide and water at supercritical or near supercritical conditions acting directly on the fine powder of the mineral.

7 Claims, No Drawings

PROCESS TO PRODUCE LITHIUM CARBONATE DIRECTLY FROM THE ALUMINOSILICATE MINERAL

1. FIELD OF INVENTION

Lithium for batteries, Lithium production from ore, supercritical carbon dioxide, green chemistry

2. BACKGROUND OF THE INVENTION

It is well known the interest to accumulate electrical energy in batteries with high storage capacity, high reversibility for charge and discharge and competitive cost.

Lithium and its compounds are well positioned to fulfil some of these conditions.

There are presently 2 major alternatives to produce lithium:
the evaporation of brine contained in lagoons where alkaline metals and calcium salts are contained
alternatively from solid minerals like spodumene $LiAl(SiO_3)_2$, petalite $LiAl(Si_2O_5)_2$, lepidolite $K_2Li_3Al_4Si_7O_{21}(OHF)_3$, containing mainly aluminium, silicium, potassium and lithium oxides.

The production from alumino silicate minerals is actually performed by heating at about 1000° C. to make the structure of the mineral more suitable for solving all metal oxides in sulphuric acid at high temperatures and pressures, and in a third stage separating lithium as a carbonate (literature 1-5).

This process presents important inconvenients:
large consumption of sulphuric acide'
high quantity of pollutant sulphates
Large energy consumption for heating the mineral to change the mineral structure
Destruction of the alumino silicate oxide matrix of the mineral powder, which could otherwise be used as a raw material for the ceramic industry

3. DETAILED DESCRIPTION OF THE INVENTION

We present now a process which consists in stirring a powder of the mineral powder under 50 micron diameter with water and carbon dioxide at a pressure of 30 to 50 bar and temperature of 150 to 180° C. The reaction may also take place at pressures of 10 to 200 bar and temperatures of 100 to 200° C., however at lower temperatures and pressures the reaction is too slow. Higher temperatures and pressures have higher operating costs.

After 1 to 6 hours contact, the mixture is cooled and the pressure is reduced. By filtration or simple decantation the solids are separated and dried to be used in the ceramic industry.

The liquid contains lithium bicarbonate. The water is evaporated and the remaining solids contain lithium bicarbonate, which can be further processed to lithium chloride or lithium metal by well known processes.

Our process produces the lithium bicarbonate without changing the remaining metal oxides contained in the mineral. Therefore, the remaining metal oxides may be sold for the ceramic industry exactly as the original mineral.

Lithium oxide contained in the mineral is appreciated in the ceramic industry because it reduces the melting temperature and the viscosity of the mixture. This objective is also obtained by mixing a small amount of sodium bicarbonate.

Sodium bicarbonate is much more abundant and less expensive than lithium oxide.

In our process there is no need for sulphuric acid, which reduces considerably the costs of processing.

As a consequence of not solving the aluminium and silicium oxides, there is no pollution caused by the solution containing metal sulphates. In fact, the normal content of lithium in minerals is below 2%. Therefore the amount of waste water is huge in the classical process using sulphates.

The fact that the powdered mineral, of ter removal of lithium in our process, can be used for the ceramic industry, reduces enormously the cost of the mineral really consumed for the lithium production.

The mineral to be submitted to treatment with carbon dioxide must be in powder, with a dimension as small as possible. The smaller dimension of the powder increases the specific surface, where the lithium oxide is contacted by carbon dioxide and water during the process.

A powder dimension under 50 micron is usual for the ceramic industry and proved to be sufficient in our process to obtain lithium.

The dissolution of the lithium oxide as lithium bicarbonate creates small channels, which increases the access of carbon dioxide to more lithium. This explains the advantage of supercritical carbon dioxide, which presents a very low viscosity and surface tension. Therefore, supercritical carbon dioxide and water penetrates better than liquid water or other solvents.

Example

We used a stainless steel AISI316 reactor with 100 ml volume equipped with a magnetic stirrer, manometer, overpressure valve, temperature indicator, two connections with valves for introducing and taking out gases. The lower part of the reactor was heated in an oven, leaving outside the instruments and valves.

We introduced:

| | |
|---|---|
| Lithium mineral Lepidolite | 20 g |
| Water | 40 g |

The reactor was closed. We connected the carbon dioxide supply and allow the pressure to be constant at 100 bar during 2 hours at an inside temperature of 200° C.

After this time, we cooled down the reactor, by disconnecting the heating and removing the reactor from the oven.

After cooling, the pressure was released, the reactor was opened.

We filtered the mixture.

The liquid phase was evaporated under vacuum and the evaporation residue was submitted to a lithium determination in an atomic emission spectrometer stimulated by microwaves.

The solids obtained by vaporisation of the liquid contained 70% of the lithium originally contained in the mineral submitted to this treatment.

The invention claimed is:
1. A process for obtaining lithium carbonate comprising reacting minerals selected from the group consisting of spodumene, petalite or lepidolite, with water and carbon dioxide at a pressure of 10 to 200 bar and a temperature of 100 to 200 C;
Separating after the reacting a solid portion from a liquid portion;
Evaporating the liquid portion; and
Obtaining as the residue of the evaporating lithium carbonate;

wherein the minerals have been previously crushed to a particle size of less than 50 microns and the reacting is performed in the absence of sulfuric acid or sodium hydroxide.

2. The process of claim 1 wherein the temperature is 150 to 180 C.

3. The process of claim 1 wherein the pressure is 30 to 50 bar.

4. The process of claim 1 wherein the reacting is performed for 1 to 6 hours.

5. The process of claim 1 wherein a ratio of the minerals to water is 1-3:20.

6. The process of claim 1 wherein the pressure of carbon dioxide is kept constant during the reacting step by adding more carbon dioxide.

7. The process of claim 1 wherein prior to evaporating comprises cooling down the mixture, depressurizing, filtered or decanted and then evaporating to dryness.

* * * * *